(12) United States Patent
Miller

(10) Patent No.: US 6,924,737 B2
(45) Date of Patent: Aug. 2, 2005

(54) VEHICLE ENGINE STATUS DETECTION MECHANISM FOR PRESENTING ENGINE STATUS TO THIRD-PARTY AUTOMOTIVE ACCESSORIES

(75) Inventor: Joseph Frank Miller, Santa Rosa, CA (US)

(73) Assignee: PNI, Corp., Santa Rosa, CA (US)

( * ) Notice: Subject to any disclaimer, the term of this patent is extended or adjusted under 35 U.S.C. 154(b) by 43 days.

(21) Appl. No.: 10/377,895

(22) Filed: Feb. 28, 2003

(65) Prior Publication Data

US 2004/0178896 A1 Sep. 16, 2004

(51) Int. Cl.[7] .............................................. B60Q 1/00
(52) U.S. Cl. ...................... 340/441; 340/438; 340/455; 340/459; 340/460; 340/461
(58) Field of Search ................................ 340/441, 438, 340/455, 459, 460, 461

(56) References Cited

U.S. PATENT DOCUMENTS

| | | | | |
|---|---|---|---|---|
| 5,225,829 A | * | 7/1993 | Bateman | 340/967 |
| 2004/0117442 A1 | * | 6/2004 | Thielen | 709/203 |
| 2004/0157113 A1 | * | 8/2004 | Klang | 429/50 |

* cited by examiner

*Primary Examiner*—Tai T. Nguyen
(74) *Attorney, Agent, or Firm*—Central Coast Patent Agency; Donald R. Boys

(57) ABSTRACT

A circuit for detecting voltage states output from a voltage generating engine has a first connection point connecting the circuit to a voltage output of the engine, a second connection point connecting the circuit to electrical ground and a digital output signal port for providing binary output values. The circuit detects voltage levels ranging above and below a nominal voltage level and assigns binary values to the detected states, the values used as instruction to a device coupled to the circuit.

16 Claims, 5 Drawing Sheets

VEHICLE ENGINE STATUS DETECTION MECHANISM FOR PRESENTING ENGINE STATUS TO THIRD-PARTY AUTOMOTIVE ACCESSORIES

FIELD OF THE INVENTION

The present invention is in the field of aftermarket accessories for automobiles and other vehicles, and pertains particularly to methods and apparatus for detecting vehicle on and off status and using the information to regulate third-party applications and apparatus.

BACKGROUND OF THE INVENTION

Components that use vehicle battery power and generated voltage from a running vehicle engine comprise a large portion of the aftermarket vehicle accessories market. Power from generators in running vehicles is used for charging cellular telephones, and for powering compact disc players, flexible lighting assemblies, and a host of other products. One of the most popular connecting point for many accessories that are not permanently installed is the cigarette lighter bay on the vehicle dashboard. Newer vehicles now come with other power outlets similar to grounded 2 and 3-prong outlets common in the home. It is believed that vehicles in the future will be provided with DC power outlets of perhaps, up to 40 volts DC.

In order to successfully operate some types of accessories that may be permanently installed in a vehicle, such as a compact disc player or an electronic navigation system for example, considerable wiring, typically to the electronic ignition harness, must be undertaken to ensure the proper voltage and ground. Products that can be connected and powered on through the lighter bay or other vehicle DC power socket are comparatively simple in design and function. Some products use the engine status of running or not running as input to their stated functions. If a cell phone, for example, were to be charged when the vehicle is not running, the power drawn to the phone comes directly from the battery of the vehicle. Therefore it is needed to include some form of vehicle engine status intelligence into the design of third-party systems and applications.

Some applications use physical vibration sensors to determine when a vehicle is running or not. A difficulty with these sensors is that they are prone to failure because of a delicate mechanical design. Also, inadvertent vibration can set off an engine status sensor and cause a related application to miss fire. Likewise, many third-party applications contain their own connection circuitry logic for interfacing with the automobile ignition wiring. Such applications are not easily connected or disconnected, and the connection circuitry is not easily detachable once installed. It would be very inconvenient, if not impossible, for end users of an engine-powered product to connect an engine status signal for their newly acquired third party apparatus to the engine's ignition control circuitry without knowledge of engine ignition electronics as a prerequisite, as well as familiarity with the specific wiring of the product in question.

What is clearly needed in the art is an engine-status detection circuitry that can be used to monitor status of a vehicle engine, and to connect a variety of both self-powered and engine-powered third-party applications to a convenient point of entry into a vehicle's circuitry. Such circuitry could be provided inexpensively and would much simplify installation and use of aftermarket accessories with vehicle electrical systems.

SUMMARY OF THE INVENTION

In a preferred embodiment of the present invention a circuit for detecting voltage states of on and off output from a voltage generating engine is provided, the states relating to engine running or not running. The circuit comprises a first connection point connecting the circuit to a voltage output of the engine, a voltage comparator, and a digital output signal port for providing the binary output values as instruction. This circuit is characterized in that the circuit compares voltage levels ranging above and below a configured nominal voltage level and assigns the binary values to the variable states, the values used as instruction to a device coupled to the circuit.

In some embodiments the engine is a vehicle engine. Also in some embodiments the first connection point is made through a vehicle DC power socket using an adapter plug. Still in preferred embodiments the binary value of 1 output from the signal port indicates a voltage level higher than the threshold level identifying a power on state of the engine. In these and other embodiments the binary value of 0 output from the signal port indicates a voltage level lower the threshold level identifying a power off state of the engine.

In some embodiments the coupled device is a dual mode pressure sensing device having a barometer mode and an altimeter mode. In these and other embodiments the barometer mode may be active according to a binary value output indicating a power off state and the altimeter mode may be active according to a binary value identifying a power on state.

In some cases the coupled device has a power saving function activated according to a binary value output indicating a power off state. Also in some cases the coupled device incorporates the circuit within the device housing and voltage is transferred thereto by voltage line. Also in some cases the circuit is incorporated within the adapter plug and the output values are transferred to the coupled device through signal wire.

In another aspect of the invention a method for alternating modes of a dual mode pressure-sensing device coupled to an engine status detection circuit is provided, the circuit providing output signaling identifying on and off states of the engine. The method comprises steps of (a) receiving a signal identifying an engine state; (b) taking pressure reading and computing value according to engine state; (c) displaying the computed pressure reading; (d) receiving a signal identifying an alternate engine state; (e) taking pressure reading and computing value according to engine state; and (f) displaying the computed pressure reading.

In preferred embodiments of the method, in step (a), the identified engine state is off and the active mode is barometer mode, and in step (d) the identified engine state is on and the active mode is altimeter mode. Also in preferred embodiments, in step (a), the identified engine state is on and the active mode is altimeter mode, and in step (d) the identified engine state is off and the active mode is barometer mode. In some cases, in steps (a) and (d), the signal comprises a binary value. Also in some cases the engine is a vehicle engine. Still further, in some cases, in steps (a) and (d), the signal is received from the engine status detection circuit through an adapter plug plugged into a vehicle DC power socket.

In yet another aspect of the invention a system for sensing atmospheric pressure and computing barometric or altimeter results for a display based on engine voltage state comparison of voltage level output from a voltage generating engine is provided, comprising a display mechanism for displaying computed results. The system comprises a pressure sensor for sensing atmospheric pressure, and an engine status detection circuit having a first connection point connecting the circuit to a voltage output of the engine, a voltage comparator, and a digital output signal port for providing the binary output values as instruction, and is characterized in that the system computes and displays results related to pressure readings in barometric mode when the engine is determined to be not running and in altimeter mode when the engine is determined to be running.

IN preferred embodiments of the system the engine is a vehicle engine. Also in preferred embodiments the first connection point is made through a vehicle DC power socket using an adapter plug. In these and other embodiments the binary value of 1 output from the signal port indicates a voltage level higher than the threshold level identifying a power on state of the engine, and the binary value of 0 output from the signal port indicates a voltage level lower the threshold level identifying a power off state of the engine. The system may incorporate the engine status detection circuit within a device housing of the system, the voltage transferred thereto by voltage line. Also, in some cases the engine status detection circuit is incorporated within an adapter plug for a vehicle DC power socket and the output values are transferred thereto through signal wire.

In variations of this invention described in enabling detail for preferred embodiments below, for the first time a status detector is provided that can help with power requirements for connected devices

BRIEF DESCRIPTION OF THE DRAWING FIGURES

FIG. 5 is a process flow diagram illustrating an altimeter measuring sequence when the engine is on.

DESCRIPTION OF THE PREFERRED EMBODIMENTS

Figure 1:
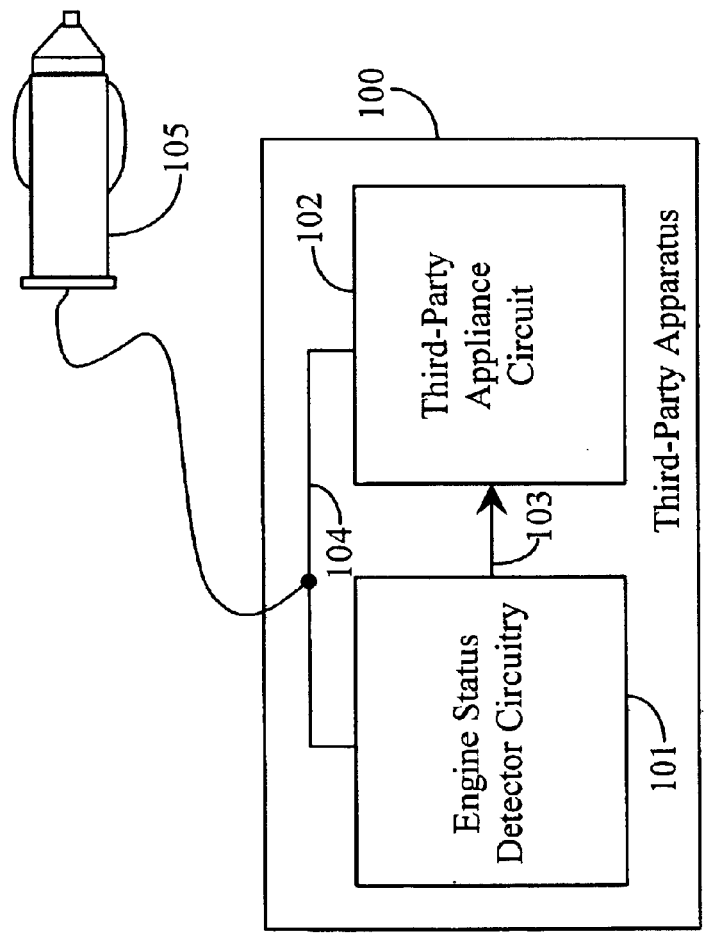
FIG. 1 is a block diagram illustrating detection circuitry and third-party apparatus integration.

FIG. 1 is a block diagram illustrating an engine status-detection circuitry 101 and third-party apparatus integration according to an embodiment of the present invention. In a preferred embodiment of the present invention engine status detection circuitry 101 is installed and integrated into a third-party aftermarket product illustrated herein as third-party apparatus 100. However, in one embodiment detection circuitry 101 can be provided as a standalone vehicle engine-status circuit configured in its own housing and in a connectable or plug-in capacity state to applicable third-party apparatus.

In a preferred embodiment connection of circuitry 101 is achieved through a vehicle lighter bay or other vehicle DC power socket by means of a conventional and well-known adapter 105 designed to plug-in to the power socket provided typically on the vehicle dashboard. A third-party appliance circuit 102 is illustrated within third-party apparatus 100 and is adapted to perform the stated function or functions of the third-party apparatus. In this example, circuitry 101 is connected to circuit 102 by a logical data path 103. A ground path 104 is provided within apparatus 100 to provide a power return path for the circuit and for the purpose of electrical safety.

Circuitry 101 provides information in the form of a voltage differential detected in comparison of both on and off states of an engine. For example, the voltage difference between a state of engine running and engine off is approximately, but not limited to, a 10 percent voltage differential. Circuitry 101 is adaptable to any type of engine that charges a set of batteries when it is running. This is because, to charge a battery, it is needed that the charging voltage be higher than the battery voltage, or current will not flow from the charging circuit into the battery.

The application of an engine status detector is usable in any type of third-party application that has one or more functions that are dependent on knowledge of whether or not the engine is actually generating current (ON) or not (battery output).

Figure 2B:
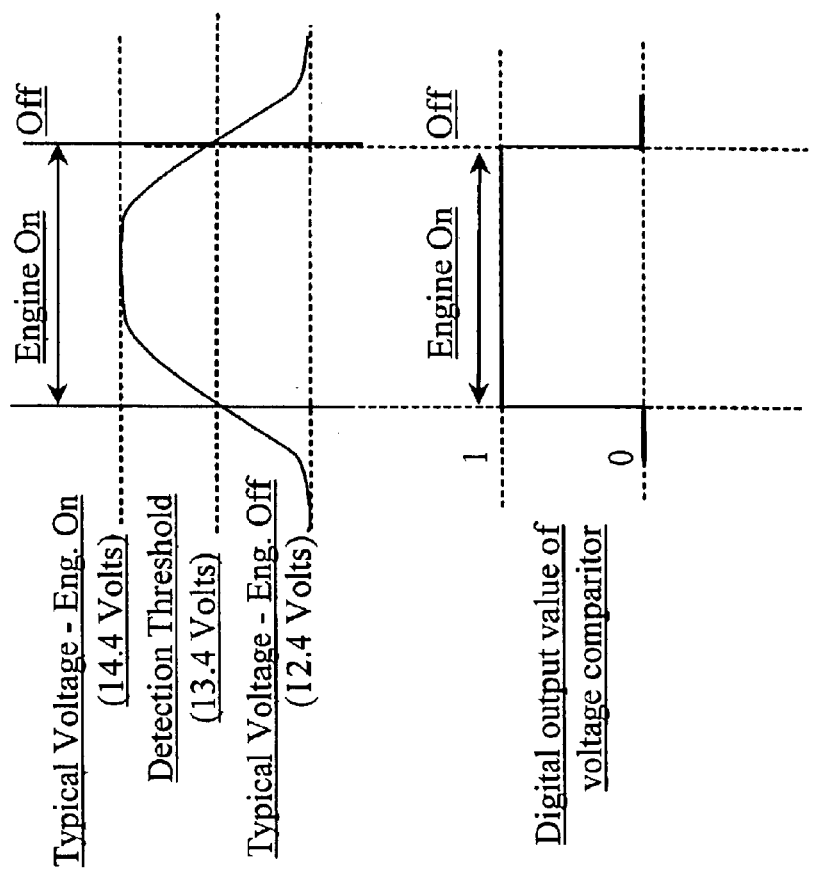
FIG. 2B is a chart illustrating detected voltage variances used to determine on/off status.
Figure 2A:
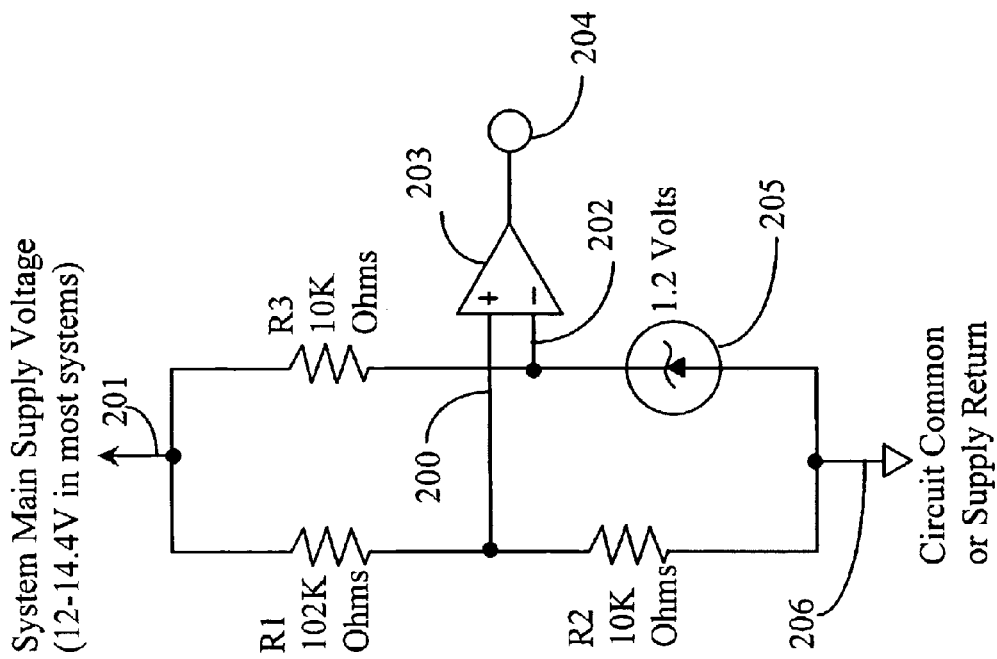
FIG. 2A is a circuitry diagram of the detection circuitry of FIG. 1.

FIG. 2A is a circuitry diagram of the detection circuitry of FIG. 1 according to a preferred embodiment of the invention. Circuitry 101 has a source supply voltage path 201 to a main supply of voltage, which for a typical vehicle is 12–14.4 V. Circuitry 101 is a closed circuit with a series of resistors illustrated herein as resistor 1 (R1) at 102K Ohms, a resistor 2 (R2) in series with R1, R2 rated at 10K Ohms, and a resistor 3 (R3) in parallel with R1, R3 rated at 10K Ohms.

Circuitry 101 has a common supply return path or Circuit Common 206. A Zener or Band Gap diode 205 is provided within circuit 101 and is adapted to provide a stable voltage reference for detection. It is assumed that a reference voltage for diode 205 is 1.2 V.

In order to measure voltage differential, an analog to digital comparator circuit 203 is provided positively connected to circuit 101 by a path 200 and grounded by a path 202. Comparator circuit 203 has a digital output 204 that provides a logical 1 that indicates engine on, or a logical 0 that indicates engine off. Comparator 203 can be a known integrated circuit (IC) such as an IC TLC3702 or any other comparable circuit for voltage comparison at the stated voltage levels. For engine circuitry carrying substantially more voltage or less voltage that is illustrated in this example illustrating voltage of a common vehicle voltage system, components rated at the appropriated voltage levels would apply. All that is required to practice the present invention is a closed circuit and comparator capable of detecting the voltage differential between battery voltage and generated voltage.

FIG. 2B is a chart illustrating detected voltage variances used to determine engine on and off status as detected by circuitry 101. In this example a typical voltage with the engine on is 14.4 Volts. The typical voltage with the engine off is 12.4 volts. The comparator of FIG. 2a produces a logical 1 when the voltage level reaches a pre-set threshold, in this case, 13.4 volts. 13.4 volts is the detection voltage, or the voltage level that must be reached before the circuit senses that the vehicles engine is running. The resulting digital waveform (shown below) is the digital output value of the voltage comparator.

Figure 3:
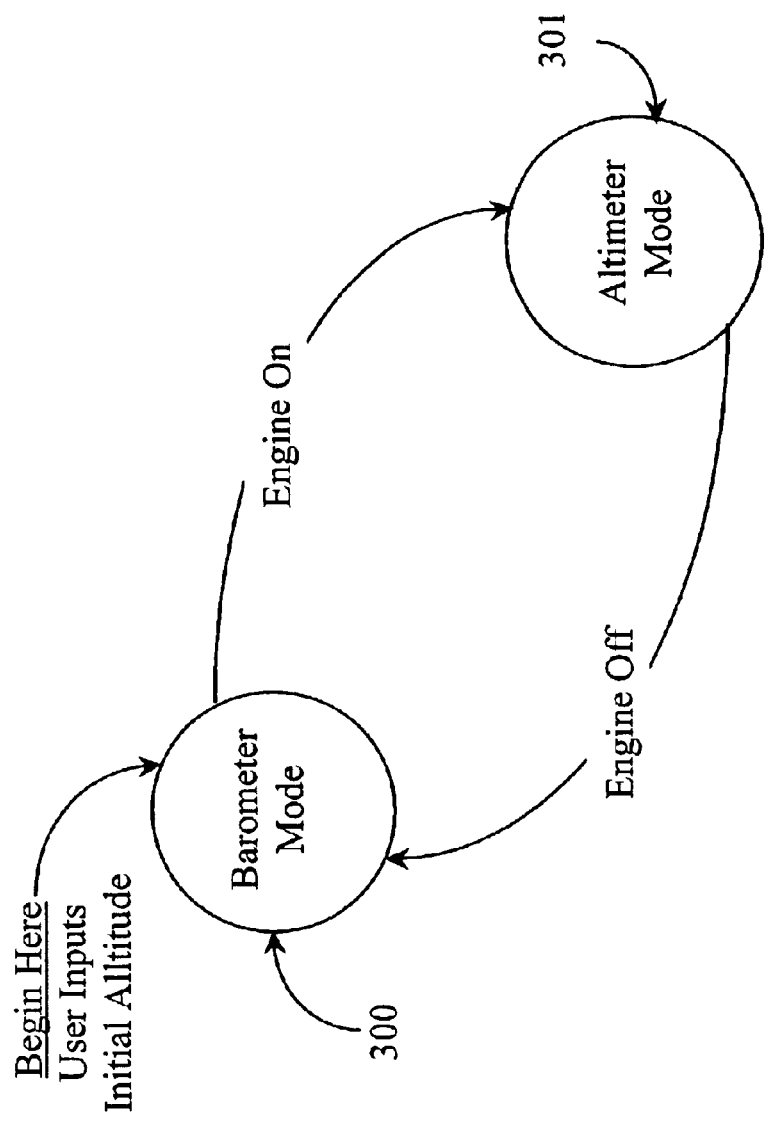
FIG. 3 is a simple block diagram illustrating a third-party pressure detection sequence made possible by the detection scheme.

FIG. 3 is a simple block diagram illustrating a third-party pressure change detection sequence made possible by the detection scheme in an embodiment of the invention. In a preferred embodiment of the present invention the detection scheme and circuitry described above are applied to a novel third-party pressure-sensing device adapted to provide barometer readings and altimeter readings based on engine detection status. Barometer readings determine atmospheric changes due to weather by measuring air pressure changes at a relative constant altitude. Altimeter readings measure the altitude elevation gain or elevation loss by measuring pressure changes against a relatively constant barometric pressure. The detection mechanism of the present invention enables a combined sensor to produce relatively accurate readings based on actual circumstances of pressure change readings.

The pressure change detection sequence is initiated by inputting an initial altitude when the vehicle is off and the sensor is in barometer mode illustrated as mode 300. When the engine is powered on, the sensor function automatically switches to altimeter mode illustrated herein as mode 301. When it is sensed that the engine has been turned off again the status reverts back to barometer mode, but saves the last altimeter reading. In this way the pressure calculations while the vehicle is running assume that any pressure change detected during the running state are due to altitude gain or loss. When the vehicle is off then, any pressure changes detected are attributed to weather changes. Saving the last reading enables off-set calculations that provide increased accuracy for reporting current altitude, and pressure readings related to weather changes. The process is detailed more fully below.

Figure 4:
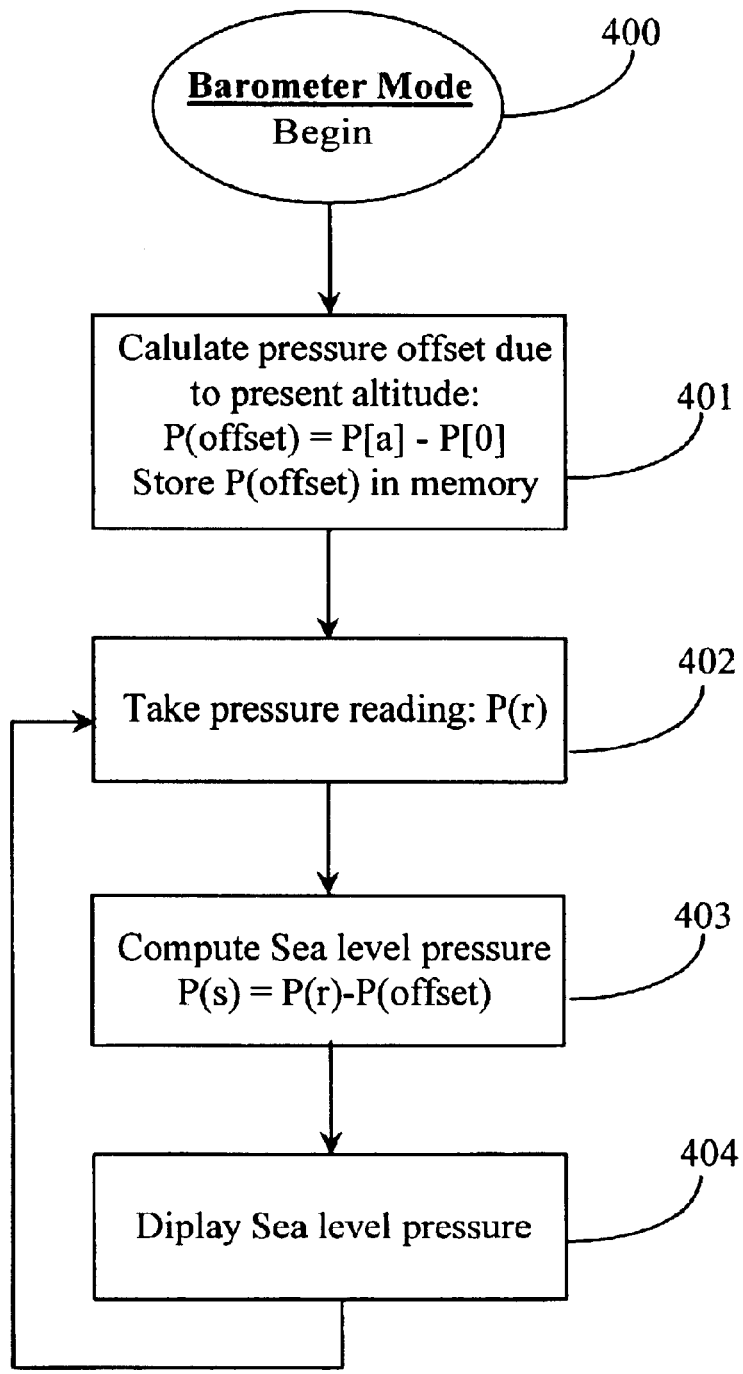
FIG. 4 is a process flow diagram illustrating a barometer measuring sequence when the engine is off.

FIG. 4 is a process flow diagram illustrating a barometer measuring sequence when the engine is off. When voltage measured by the detection circuit of the present invention is found to be below 13.4 Volts or a similar pre-set threshold, the vehicle is considered to be off and idle. At step 400 the barometric mode of the sensor function begins. At step 401 a pressure-offset value is calculated to the last altimeter reading being saved to memory. Therefore, P(offset)=P[a] P[0]. The P (offset) value is then stored in memory. P[a] is the mean pressure value for the present altitude, which is a calculated value. P[0] is the mean sea level pressure, which is a well established constant of 1013.25 mBar. P[offset] value then becomes the pressure differential between sea level and the present altitude.

At step 402 the sensor takes a pressure reading P (r). The device then computes the correct sea level pressure P (s)=P (r)–P (offset) at step 403. At step 404 the device displays the altitude compensated barometric pressure, or sea level pressure, which is the most common form of reporting weather related barometric pressure It is noted that in continuous fashion, the sequence resolves back to step 402.

To automate switching between the two pressure sensitive modes, barometric mode and altimeter mode, the device depends on the knowledge of whether it is stationary or moving. With knowledge of vehicle engine status information an assumption can be made that any pressure change during the active state of "engine on" of the vehicle is due to altitude change. Likewise, when the device is stationary it is assumed that pressure change is due solely to atmospheric changes (weather). The engine status information enables the third party device to intelligently switch between altimeter mode and weather monitoring (barometric) mode. The engine status signal provides the assumption that when the engine is on that the vehicle is most likely moving or going to be moving causing the sensor device to automatically switch operating mode between barometer mode and altimeter mode. This causes the processor to retrieve the previous attitude information stored in memory when the unit switched from altitude mode to barometer mode the last time. The logic is that since the engine was off the vehicle could not have moved and the altitude then could not have changed.

Figure 5:
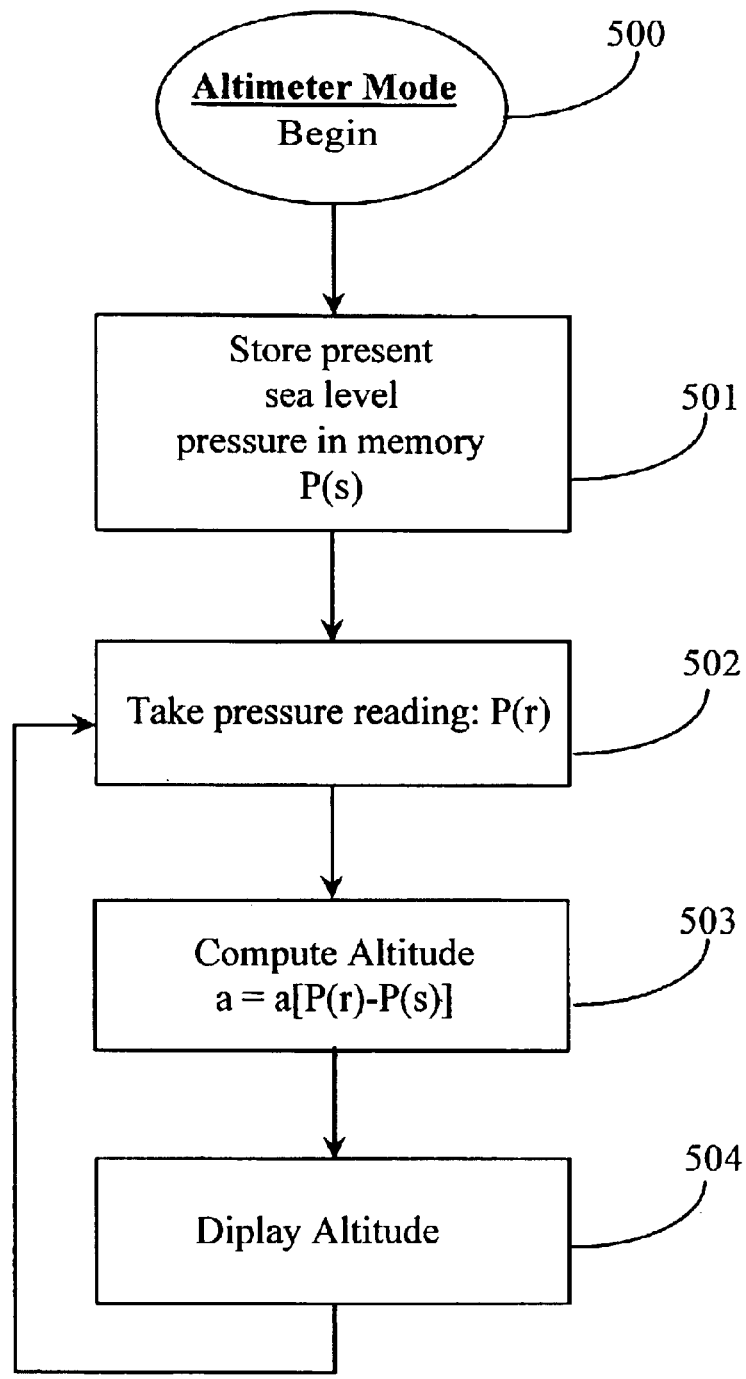

FIG. 5 is a process flow diagram illustrating an altimeter measuring sequence when the engine is on. At step 500 the engine is powered on and the altimeter mode begins. At step 501 the present sea level pressure P (s) is stored in memory. At step 502 a pressure reading P (r) is taken.

At step 503, the correct altitude (a) is computed a=a [P(r)–P(s)]. At step 504, the altitude value is displayed. The sequence resolves back to step 502 while the status signal continues to report an "engine on" status. In an alternative embodiment, the device can be calibrated (enter the altitude value) before the beginning of every trip if the trip starts basically from a same location. A one touch button can be provided and once depressed recalls a previously set altimeter value. This makes calibration easier in cases where the vehicle begins trips from the same location where it was previously calibrated.

In the case of a pressure sensing device that senses atmospheric pressure, combined function while traveling enables relatively accurate results because the most current P (s) reading or the most current (a) reading is stored in memory at the time the device switches modes and used as the offset for computations.

The engine detection circuitry can be applied to other third-party applications that utilize energy saving features in some or all of their functions. For example, when the engine is on and power is provided through a generation device, function can be maintained at a robust level without taxing the system. When the engine is determined to be off, power conservation measures installed with the device come into play to save battery power.

In one embodiment of the invention the detection circuitry is provided as an adapter to a variety of third-party apparatus that may use the differential voltage signals to provide certain functions. In this case the third-party apparatus would be adapted to plug-in to the detector circuit. In still another embodiment the circuitry could be provided within the vehicle circuitry at various points that lead to application of third party apparatus. In this case the apparatus would plug into the access point that is best situated to service the apparatus. There are many possibilities. The method and apparatus of the present invention can be applied to any type of engine that uses a generator to charge system batteries and to power system apparatus while the engine is running.

The method and apparatus of the invention, in light of the many possible embodiments, should be afforded the broadest possible scope under examination. The spirit and scope of the present invention is limited only by the claims that follow.

What is claimed is:

1. A circuit for detecting voltage states of on and off output from a voltage generating engine, the states relating to engine running or not running comprising:

a first connection point connecting the circuit to a voltage output of the engine;

a voltage comparator; and a digital output signal port for providing binary values;

characterized in that the circuit compares voltage levels ranging above and below a configured nominal voltage level and assigns the binary values to variable states, the values used as instruction to a dual mode pressure sensing device having a barometer mode and an altimeter mode coupled to the circuit.

2. The circuit of claim 1 wherein the engine is a vehicle engine.

3. The circuit of claim 2 wherein the first connection point is made through a vehicle DC power socket using an adapter plug.

4. The circuit of claim 3 wherein the circuit is incorporated within the adapter plug and the output values are transferred to the coupled device through signal wire.

5. The circuit of claim 1 wherein the binary value of 1 output from the signal port indicates a voltage level higher than the threshold level identifying a power on state of the engine.

6. The circuit of claim 1 wherein the binary value of 0 output from the signal port indicates a voltage level lower the threshold level identifying a power off state of the engine.

7. The circuit of claim 1 wherein the barometer mode is active according to a binary value output indicating a power off state and the altimeter mode is active according to a binary value identifying a power on state.

8. The circuit of claim 1 wherein the coupled device has a power saving function activated according to a binary value output indicating a power off state.

9. The circuit of claim 1 wherein the coupled device incorporates the circuit within the device housing and voltage is transferred thereto by voltage line.

10. A system for sensing atmospheric pressure and computing barometric or altimeter results for a display based on engine voltage state comparison of voltage level output from a voltage generating engine, comprising:

a display mechanism for displaying computed results;

a pressure sensor for sensing atmospheric pressure; and an engine status detection circuit having a first connection point connecting the circuit to a voltage output of the engine, a voltage comparator, and a digital output signal port for providing the binary output values as instruction;

characterized in that the system computes and displays results related to pressure readings in barometric mode when the engine is determined to be not running and in altimeter mode when the engine is determined to be running.

11. The system of claim 10 wherein the engine is a vehicle engine.

12. The system of claim 11 wherein the first connection point is made through a vehicle DC power socket using an adapter plug.

13. The system of claim 11 wherein the engine status detection circuit is incorporated within an adapter plug for a vehicle DC power socket and the output values are transferred thereto through signal wire.

14. The system of claim 10 wherein the binary value of 1 output from the signal port indicates a voltage level higher than the threshold level identifying a power on state of the engine.

15. The system of claim 10 wherein the binary value of 0 output from the signal port indicates a voltage level lower the threshold level identifying a power off state of the engine.

16. The system of claim 10 incorporating the engine status detection circuit within a device housing of the system the voltage transferred thereto by voltage line.

* * * * *